United States Patent [19]
Koplewicz et al.

[11] 3,820,065
[45] June 25, 1974

[54] PARKING AID DEVICE

[76] Inventors: Joseph Koplewicz, 42 Bellwood Dr., New Hyde Park, N.Y. 11040; Stanley S. Brenner, 237 Joludow Dr., Massapequa, N.Y. 11758

[22] Filed: Dec. 11, 1972

[21] Appl. No.: 313,688

[52] U.S. Cl. ................................................ 340/51
[51] Int. Cl. .................................................. G08g 1/14
[58] Field of Search ........ 200/61.41, 61.44; 340/22, 340/31 R, 38, 39, 51, 56, 322, 61

[56] References Cited
UNITED STATES PATENTS

| | | | |
|---|---|---|---|
| 1,973,275 | 9/1934 | Babson | 340/31 R X |
| 2,371,909 | 3/1945 | Naerbo | 340/31 R X |
| 2,454,896 | 11/1948 | Traub | 340/61 |
| 3,214,732 | 10/1965 | Young | 340/322 X |
| 3,463,936 | 8/1969 | Adem | 340/322 X |
| 3,509,527 | 4/1970 | Oakes et al. | 340/51 |
| 3,530,432 | 9/1970 | Pope | 340/31 R |
| 3,566,390 | 2/1971 | Zevas et al. | 340/322 UX |
| 3,581,300 | 5/1971 | Eloranta | 340/322 X |

*Primary Examiner*—Donald J. Yusko
*Attorney, Agent, or Firm*—Arthur T. Fattibene

[57] ABSTRACT

An electrically operated parking indicator to indicate the proper position of a vehicle, e.g., in parking a vehicle in a garage. The parking indicator includes a signalling means, e.g., a light bulb which is actuated when the vehicle is properly positioned, and which signal is automatically de-energized upon the lapse of a predetermined time interval.

3 Claims, 4 Drawing Figures

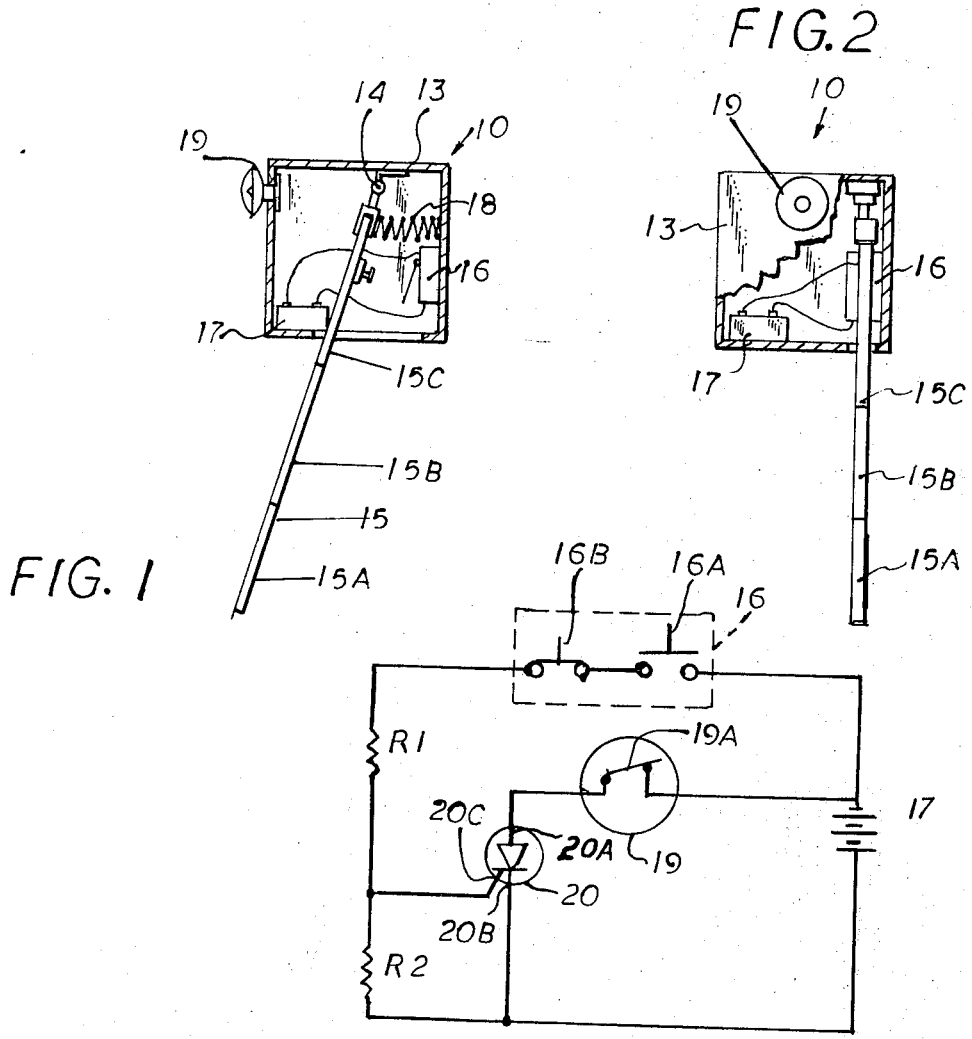
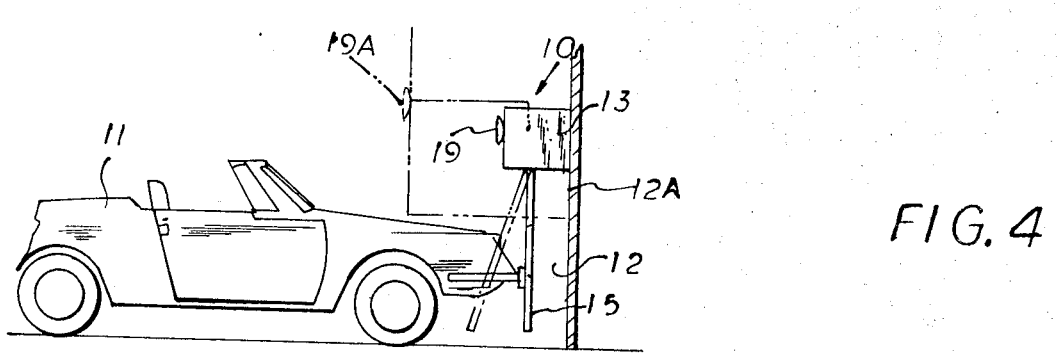

PARKING AID DEVICE

PROBLEM AND PRIOR ART

Heretofore an operator of a vehicle frequently experiences considerable difficulty in parking a vehicle in a garage or other small enclosure. The problem is particularly aggravated as the size of the vehicle becomes bigger and the size of the parking enclosure remains unchanged. The problem also is acute when the operator has difficulty in judging distance and/or with depth perception. For these reasons it frequently happens that a driver or operator in parking a vehicle sooner or later will cause the vehicle to make contact with the garage or enclosure and thereby damage either the vehicle or the garage or both.

Heretofore numerous efforts have been made to obviate the problem as evidenced by U.S. Pat. Nos. 2,879,350; 3,026,508; 3,395,387; 3,219,972 and 3,493,925. However such efforts required relatively complex and expensive structure, and in many instances were not deemed practical.

OBJECTS

An object of this invention is to provide an electrically operated parking device which is relatively simple in structure, inexpensive to manufacture and to operate, and which is positive in operation.

Another object of this invention is to provide a parking indicator which is compact so as to occupy a minimum of space.

Another object is to provide a parking device in which the indicator may be located at an optimum location.

BRIEF SUMMARY OF THE INVENTION

The foregoing objects and other features and advantages are attained by an electrically operated parking indicator which comprises a source of electrical energy to which there is connected in parallel an activating circuit and indicating circuit. The indicating circuit includes a pair of switches including an open switch and a closed switch connected in series with the source of electrical energy. The indicating circuit includes a signalling means, e.g., a light bulb and a switch means which is adapted to be triggered when the activating circuit is energized by the operation of the pair of switches which are sequenced to momentarily energize the activating circuit by a feeler arm which is displaced by the vehicle when the vehicle is properly positioned. The signalling means or light bulb includes a switch means to automatically deactivate the signal means upon the lapse of a predetermined time interval.

FEATURES

A feature of this invention resides in the provision of a wholly self-contained parking indicator which is arranged to be installed at the critical area.

Another feature resides in the provision of an electrically operated parking device which is actuated when the vehicle is within a predetermined distance from the surrounding enclosure.

Another feature resides in the provision of an electrically operated parking device which can be actuated by very low voltage batteries in a manner whereby the condition or life of the battery can be readily ascertained.

Other features and advantages will become more readily apparent when considered in view of the drawings and specifications in which:

FIG. 1 is a sectional side view of an electrical parking indicator embodying the present invention.

FIG. 2 is a front view of the parking indicator of FIG. 1 having portions thereof broken away.

FIG. 3 is a schematic wiring diagram of the electrical components of the parking indicator of FIGS. 1 and 2.

FIG. 4 is a side elevation view illustrating the parking indicator in an operative arrangement.

Referring to the drawings, there is illustrated an electrically operated parking indicator 10 for ascertaining the position of a vehicle with respect to its surrounding enclosure. For example, in FIG. 4 the parking indicator 10 is illustrated in an operating position for determining the position of an automobile 11 within a garage enclosure 12. While the present invention will be specially described as a parking indicator 10 for determining the position of an automobile 11 within a garage enclosure 12 it will be readily understood that the parking indicator may be equally applied to the parking or the determination of the position of other types of vehicles as for example, boats, airplanes and the like within a surrounding enclosure, e.g., a dock, hanger and the like.

The parking indicator 10 comprises a housing 13 which may be suitably supported, e.g., on a wall portion 12A of an enclosure 12 or on any other suitable supporting surface. Pivotally mounted on the housing 13 about a suitable pivot pin 14 is a switch operator in the form of a feeler 15. It will be understood that the feeler 15 may be formed of a plurality of connected segments, e.g., 15A, 15B and 15C so that the length thereof may be rendered adjustable or variable. The respective segments 15A, 15B and 15C may be threaded or otherwise connected in end to end relationship or alternatively they may comprise of telescoping segments which can be extended to a desired length. As seen in FIG. 4, the free end of the feeler 15 being extended so as to be engaged by a portion of a vehicle, e.g., the bumper, as the vehicle approaches the end wall portion 12A of a garage enclosure 12.

Disposed within the housing 13 is a switch means 16 which is connected in series to a source of electrical energy. While the source of electrical energy may constitute a line or house current of the garage, the illustrated embodiment utilizes a low voltage battery source 17 as the source of electrical energy. For example the battery source 17 may comprise a low voltage flashlight or lantern type battery. The switch means 16 which is adapted to be actuated by movement or displacement of the feeler 15 includes a pair of switches 16A, 16B wired in series wherein one switch is an open switch and the other is a closed switch. The switches 16A, 16B are arranged so that when activated, the open one closes and the closed one opens in a predetermined timed sequence as will be hereinafter described.

As best seen in FIG. 1, the feeler 15 is maintained under a bias by a spring 18 which tends to normally bias the feeler toward an inoperative position as seen in FIG. 1, or as seen in the dot-dash line position of FIG. 4.

Mounted on the housing 13 is a signalling or indicating means 19 which is energized as the automobile approaches its limiting position within the garage or enclosure 12 upon the displacement of the feeler or operating arm. Alternatively the signalling or indicating means 19 may be remotely disposed from the housing 13 as seen in FIG. 4 at position 19A. Preferably the signalling means comprises an electric light bulb 19 which is wired in parallel with respect to the battery source 17 and the switch means 16. Connected in series with the light bulb 19 and in parallel with the pair of switches 16A, 16B is a second switch means 20 which when actuated triggers the circuit to the signal or indicating means 19.

In the illustrated embodiment, the second mentioned switch means 20 comprises a variable impedance means, as for example, a silicon rectifier which has an input electrode 20A, an output electrode 20B, and a control electrode 20C. As best seen in FIG. 3 the control electrode 20C of the silicon rectifier is connected at the junction of resistor R1 and resistor R2 which are disposed in series with switches 16A, 16B.

The circuit described thus includes an activating circuit source or battery 17, the sequential operating, series connected switches 16A, 16B and the resistors R1 and R2. Wired in parallel thereto is the indicating circuit which includes a signal means 19, e.g., a flasher type bulb and the triggering means or silicon rectifier 20 which activates the lamp 19 when the activating circuit is energized.

The signal bulb 19 illustrated is of the type which has a thermal switch portion 19A disposed adjacent the filament thereof whereby the heat generated by the bulb when energized causes the thermal switch portion 19A to open and thereby deenergize the circuit, and upon cooling to reset itself to its normally closed position to ready the circuit for a subsequent operation.

The operation of the indicator 10 is as follows: in the normally de-energized state, as seen in FIG. 1, both the actuating circuit and the indicating circuit are in a de-energized state. As the automobile 11 is driven into the garage enclosure 12, the front end of the car, as seen in FIG. 4 engages the feeler 15 as it approaches its limiting position adjacent the end wall 12A of the garage. The displacement of the feeler 15 against the force of the spring 18 causes the feeler to activate switch means 16 whereby the open switch 16A is closed to effect a momentary energizing of the activating circuit followed after a predetermined time delay by the opening of the closed switch 16B. The sequencing of switches 16A and 16B is such that the activating circuit is sufficiently energized to trigger the switch means or silicon rectifier 20 of the indicating circuit to permit a current flow therethrough to activate the bulb 19. The operator viewing the lighting of the bulb is thus warned that the automobile has reached its predetermined limit of safe travel and should be stopped. As the indicating lamp or bulb 19 includes a thermal switch 19A disposed so as to be heated by the filament of the bulb, the circuit to the bulb will be automatically de-energized after a lapse of a determined time interval by the opening of the thermal switch. Thus after the car has been properly parked, the circuit is automatically de-energized. The cooling of the thermal switch after the circuit has been de-energized causes the same to be repositioned to ready the circuit for subsequent operation.

When the car 11 is backed out of the enclosure as seen in FIG. 4, the spring 18 operating on the feeler 15 will restore the feeler to its normal inoperative position as seen in FIG. 1 or in the phantom line in FIG. 4. In doing so sequencing of switches 16A and 16B is reversed causing the actuating circuit to be momentarily energized to again trigger the indicating circuit and energizing the bulb 19 for a predetermined time interval. By effecting the triggering of the indicating circuit and the energizing of the bulb 19, the backing of the car off the feeler will indicate to the driver that the batteries are charged.

The circuit thus described incorporates a built-in check means to ascertain the charge of the battery or the operativeness of the circuit each time the car is either moved into or out of position within the garage.

While the signal means has been defined as a visible type, i.e., a light, it will be understood that an audible signal such as a horn or the like may be susbstituted in lieu thereof. It will be understood that one or more feelers 15 may be appropriately positioned and wired in circuit so that a plurality of signals can be given whenever an auto is driven too close to an enclosure wall.

While the instant invention has been described with respect to a particular embodiment thereof it will be readily understood and appreciated that variations and modifications may be made without departing from the spirit or scope of the invention.

What is claimed is:

1. A parking indicator comprising:
   a housing,
   a switch operator pivotally mounted on said housing adapted to be activated by a vehicle,
   an indicating means,
   an electric circuit for energizing said indicating means,
   said circuit including a source of electrical energy, and a switch means to momentarily energize said circuit when said switch operator is activated,
   said switch operator being disposed adjacent said switch means to activate and deactivate said switch means upon the displacement thereof,
   a triggered switching means disposed in series circuit with said indicating means for energizing said indicating means when said switching means is rendered conductive, and including trigger means connected to said switch means for momentary energization thereby to render the switching means conductive,
   automatically operated means in circuit with said indicating means for de-energizing the circuit thereto after a lapse of a predetermined time interval,
   said indicating means including a flasher lamp,
   and said automatically operated means comprising a thermal switch disposed in said lamp.

2. The invention as defined in claim 1 wherein said switch means includes a pair of switches wired in series with said source of energy,
   one of said switches being normally open and the other normally closed, said switches being connected in series, and
   said switches being alternately actuated by said switch operator upon the displacement thereof by a vehicle.

3. The invention as defined in claim 1 wherein said triggered switch means includes a silicon control rectifier connected in circuit between said indicating means and said source of electrical energy whereby said silicon control rectifier is energized by the momentary energizing of said circuit.

* * * * *